April 10, 1956   L. C. HEAL   2,741,447
CONSTRUCTION OF HOLLOW BODIES
Filed Feb. 4, 1952   7 Sheets-Sheet 1
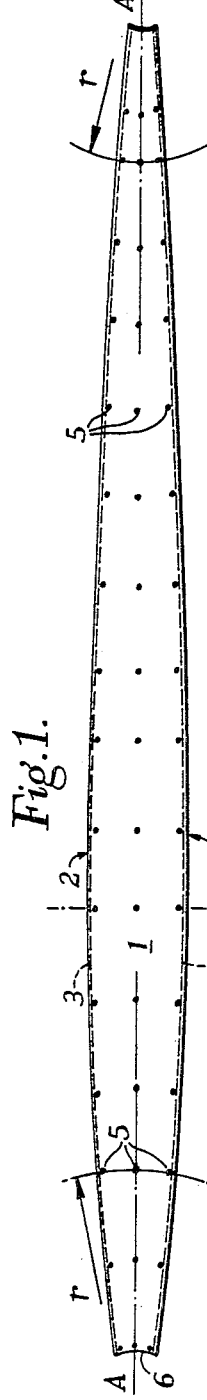
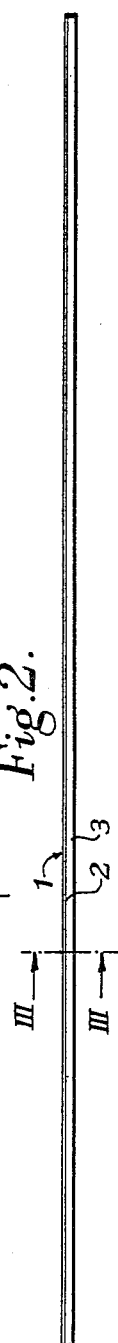
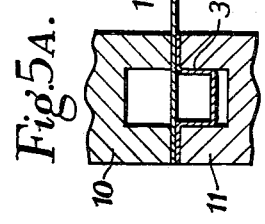
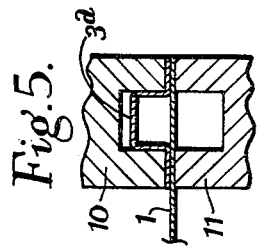
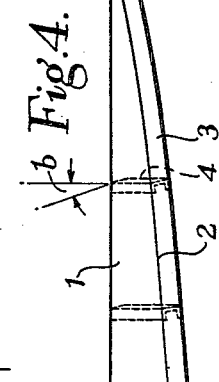
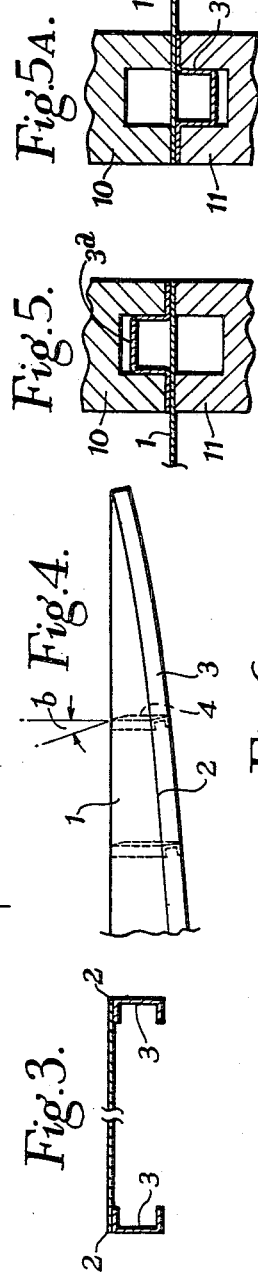
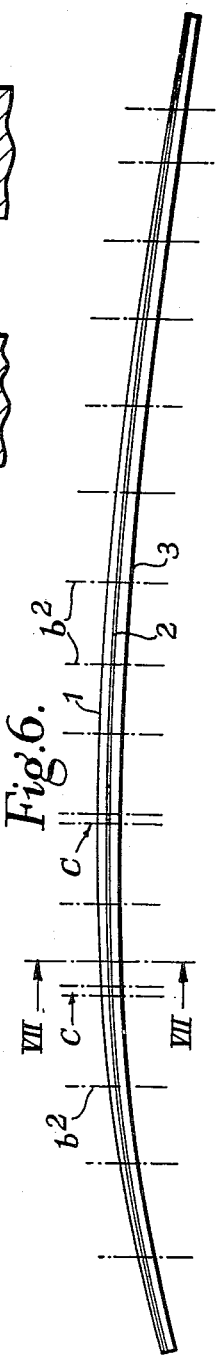
INVENTOR
Lionel Charles Heal
BY
Henderoth, Lind & Ponack
ATTORNEYS.

April 10, 1956  L. C. HEAL  2,741,447
CONSTRUCTION OF HOLLOW BODIES
Filed Feb. 4, 1952  7 Sheets-Sheet 2
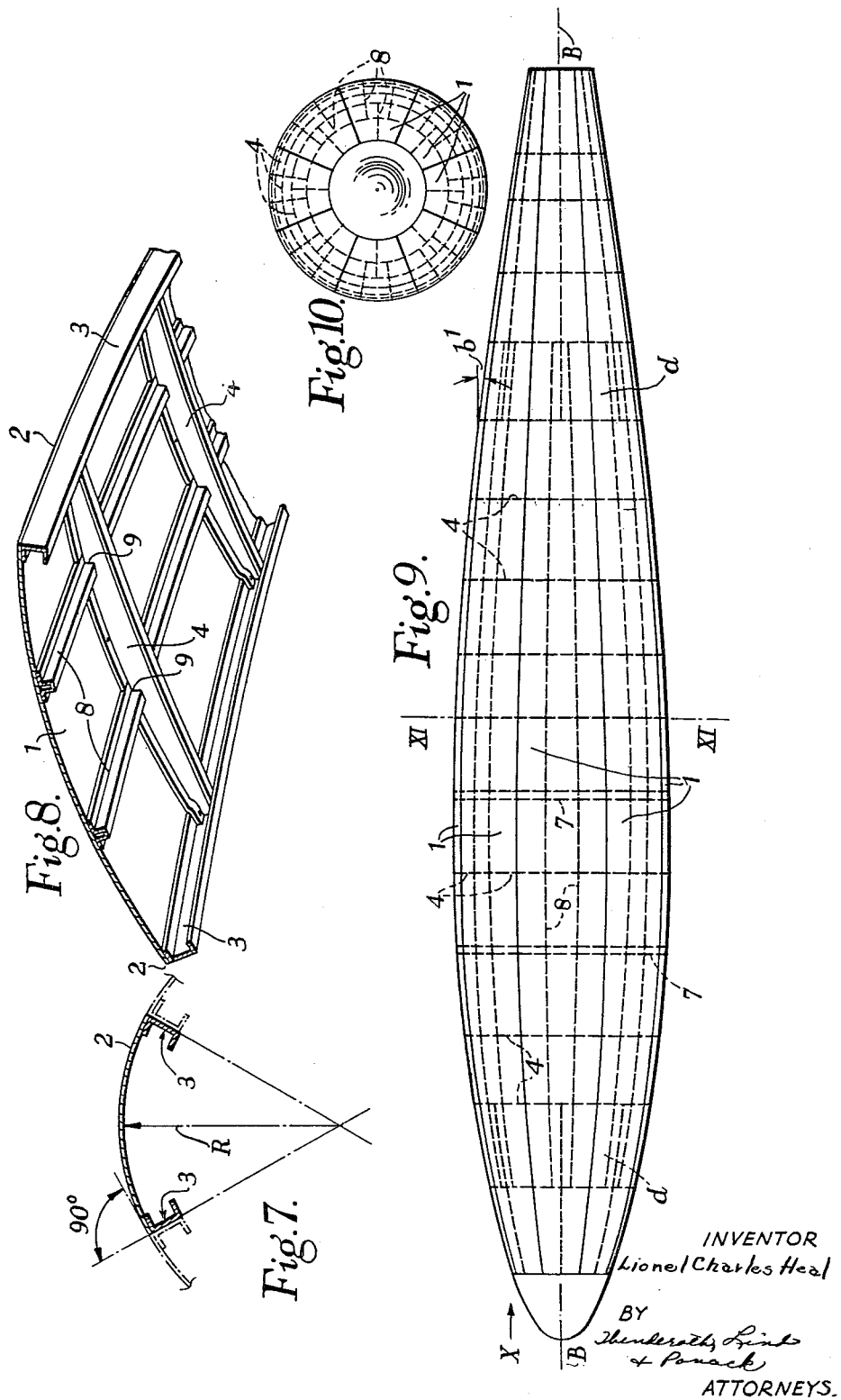

April 10, 1956 L. C. HEAL 2,741,447
CONSTRUCTION OF HOLLOW BODIES
Filed Feb. 4, 1952 7 Sheets-Sheet 3
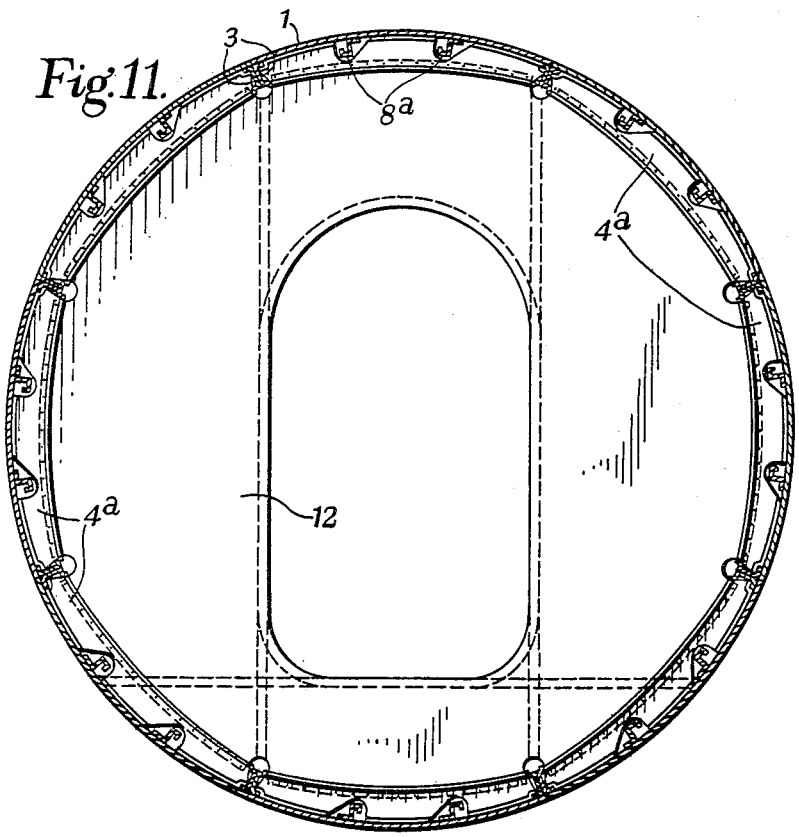
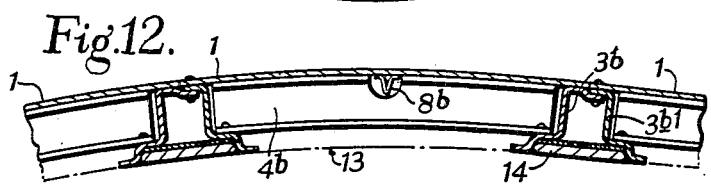
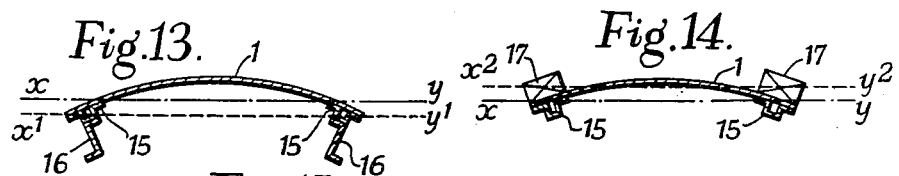
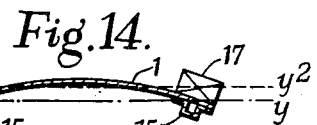
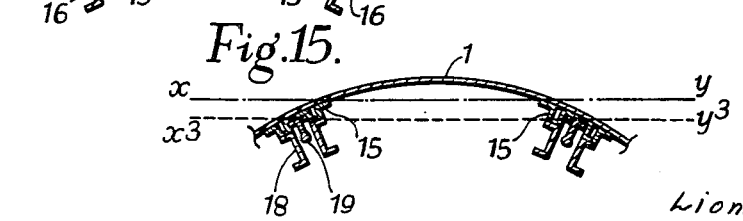
INVENTOR
Lionel Charles Heal
BY
ATTORNEYS

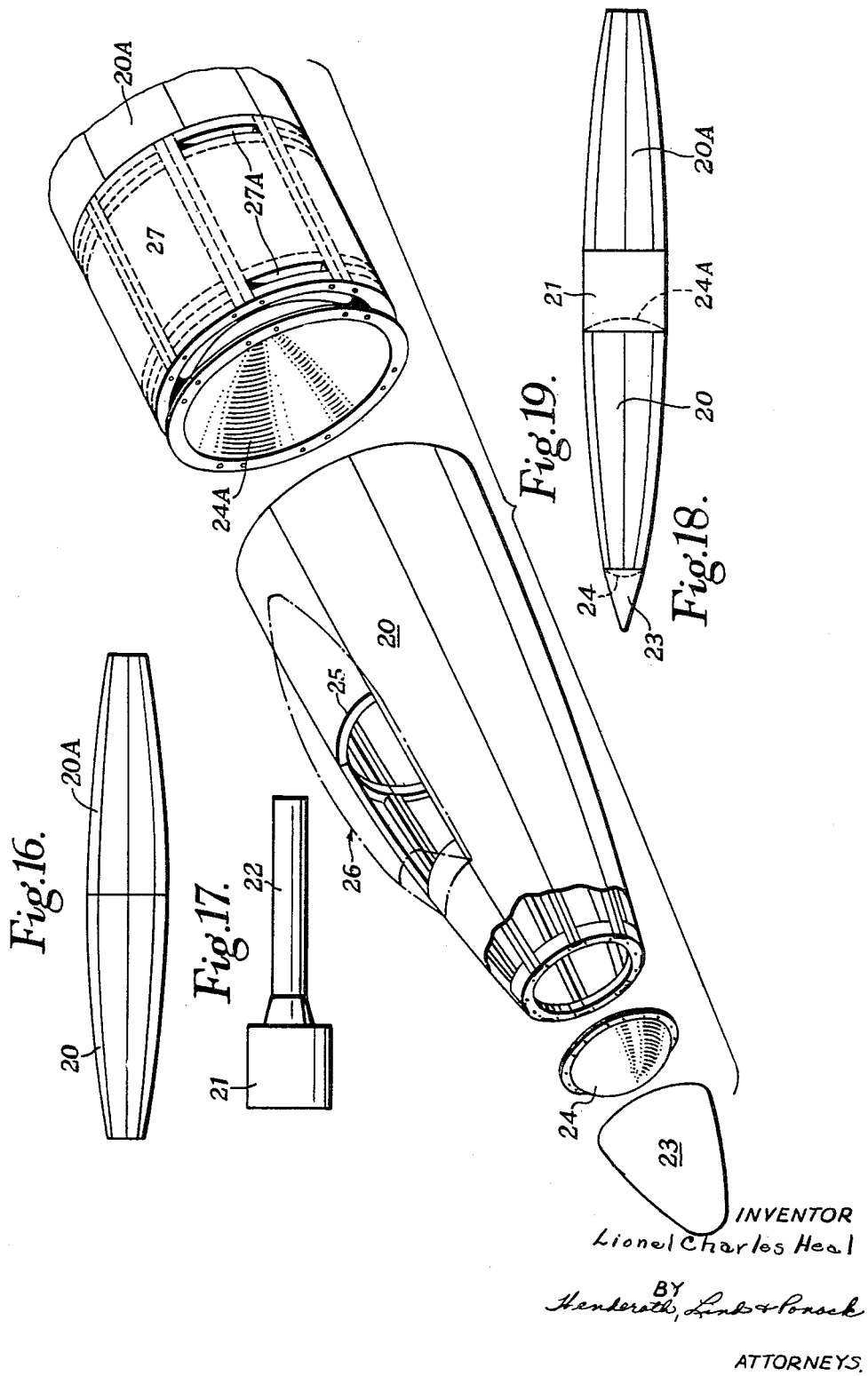

April 10, 1956 L. C. HEAL 2,741,447
CONSTRUCTION OF HOLLOW BODIES
Filed Feb. 4, 1952 7 Sheets-Sheet 5
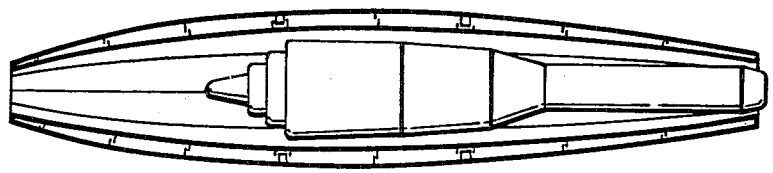
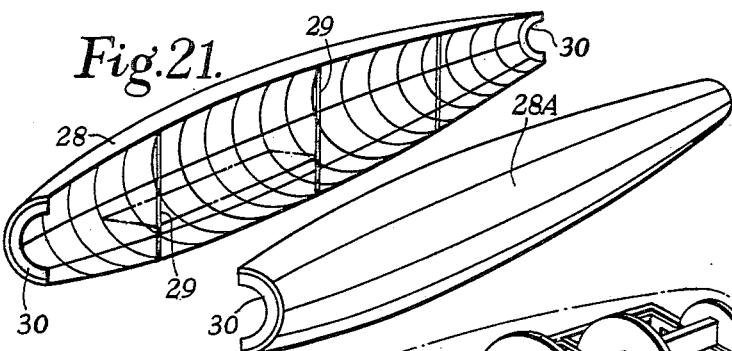
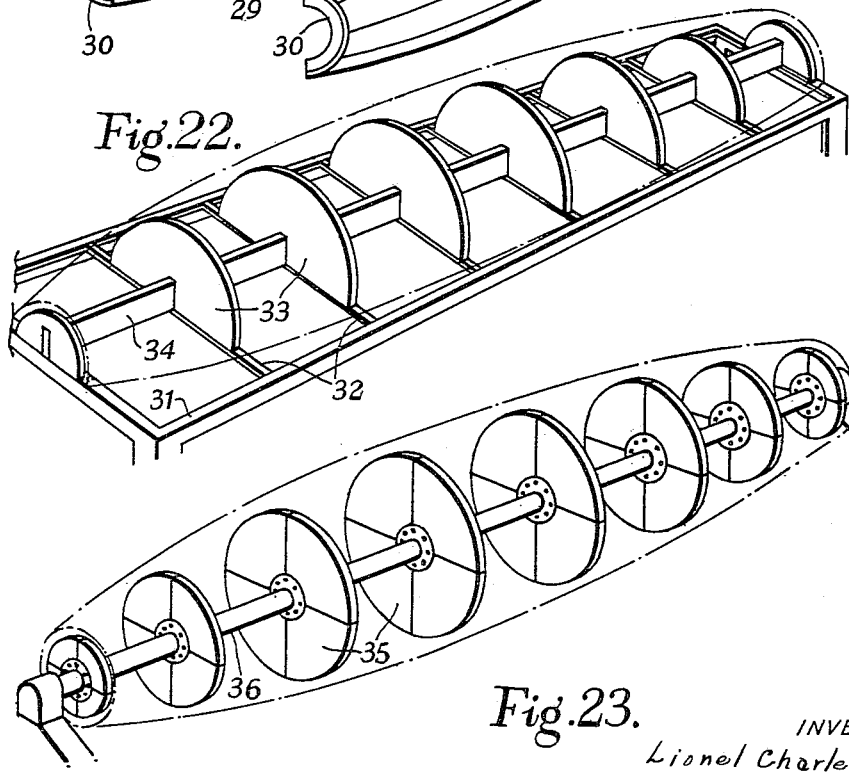
INVENTOR
Lionel Charles Heal
ATTORNEYS

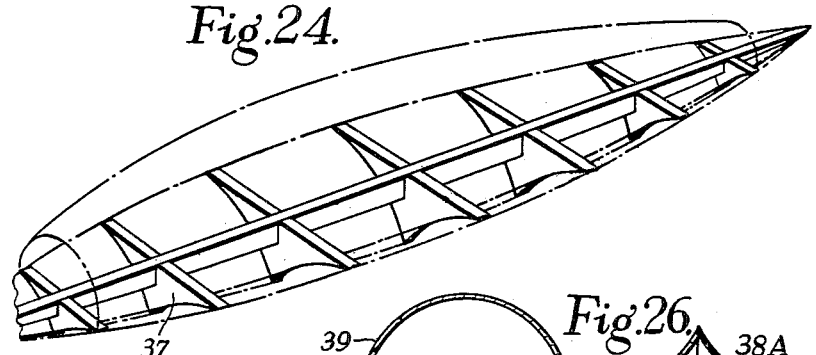
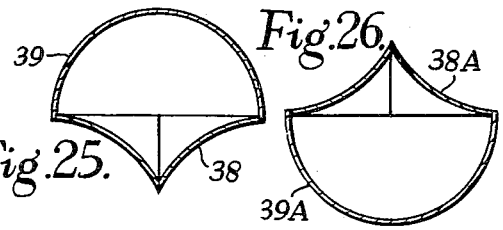
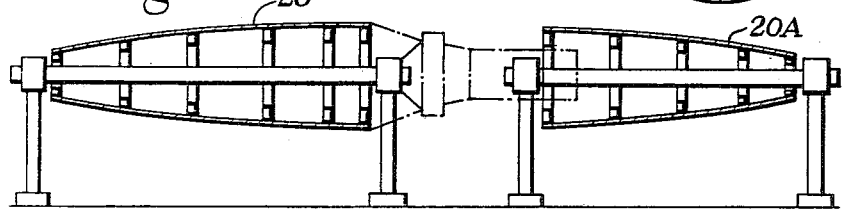
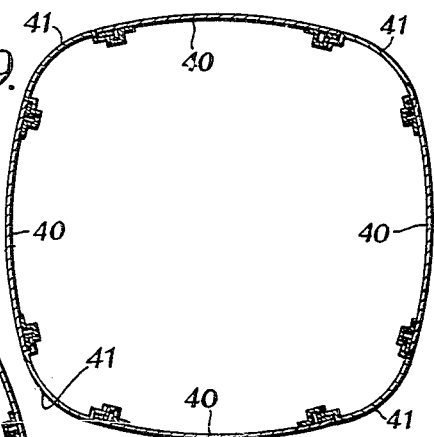
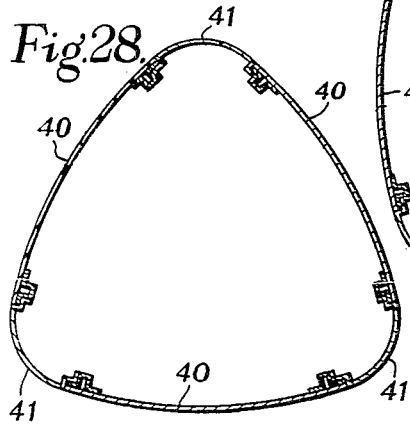

April 10, 1956          L. C. HEAL          2,741,447
CONSTRUCTION OF HOLLOW BODIES
Filed Feb. 4, 1952          7 Sheets-Sheet 7
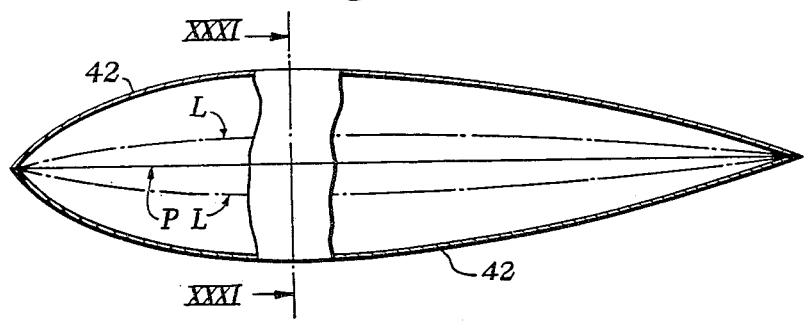
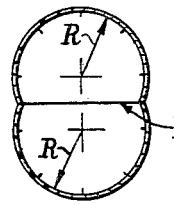
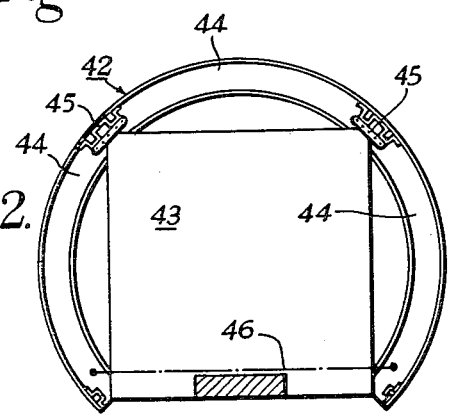
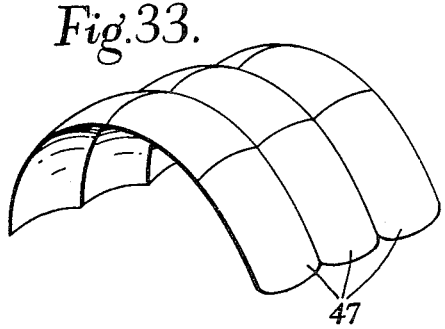
INVENTOR
Lionel Charles Heal
BY
*Henderson, Link & Ponack*
ATTORNEYS.

United States Patent Office 2,741,447
Patented Apr. 10, 1956

2,741,447
CONSTRUCTION OF HOLLOW BODIES

Lionel C. Heal, Luton, England

Application February 4, 1952, Serial No. 269,765

7 Claims. (Cl. 244—119)

This invention relates to the construction of metal or wooden hollow bodies and components thereof, as hereinafter described and is concerned primarily and basically with the production of thin shells with skin-like surfaces having double curvature, that is, curvature in both longitudinal and transverse directions. Examples of bodies having double curvature are to be found in the streamlined fuselages and hulls of aircraft, and the application of the invention to parts of aircraft will be more particularly described herein. The invention, however, is not limited to bodies of this form, but may be applied, as described later, to other bodies in which part of the shell has curvature in one direction only, that is, longitudinal curvature.

The main object of the invention is to provide an improved method of fabricating the shells of such bodies from flat plates, panels or strips of tapering or other required shape without recourse to preforming the plates, panels or strips into permanently deformed longitudinally and transversely curved units.

The preforming of plates, panels or strips into permanently deformed units having double curvature is practised extensively, particularly in the aircraft industry, and has hitherto involved the use of expensive stretching equipment, which is avoided by the method of fabricating bodies according to this invention.

The invention is especially applicable to fabricating a shell which is of circular or of circular arc cross section throughout its length, but is applicable also to the fabrication of a shell in which a part only of the cross section thereof, at any point along the length of the shell, is of circular arc form. Aircraft fuselages and hulls are examples of such shells.

It is to be understood that the expression "shell" as herein employed is not to be interpreted as limited to shells of "closed" form in cross section, but include also shells of "open" form, such as boats and similar structures having surfaces of single or double curvature, especially the latter, these surfaces being constituted wholly or in part by zones of circular arc form in cross section. From the foregoing observation it will be understood also that the curvature is not necessarily of an outwardly bulging or convex form as in the case of most aircraft fuselages, but can be of recessed or concaved form, as in the case of the keel portion of a boat or a seaplane float. Other applications of the invention include those of inducing tension in the skins of wings, and the production of both skins of a double-wall fuselage or similar structure, of engine nacelles, wind tunnels and other curved surface structures requiring a smooth inner skin.

The advantages claimed for method of construction according to this invention are as follows:

(a) The need of preforming double-curvature elements by laborious hand work on prototypes and by drop hammer and die blocks in production is completely eliminated, and, as already mentioned, expensive stretching equipment can be abolished.

(b) The riveting of skins to stiffeners is made more accessible and if preferred the use of shot-welding or strip-welding in its various forms and of cementing is made possible. Since the strips or the like employed will generally be symmetrical about a longitudinal axis use may be made of a single combined press and heating jig for cementing edge members on to the strips or the like while these are in a flat condition.

(c) The skins of all segments may be shaped to a common template as the width at any point along its length is a constant proportion of the total circumference.

(d) Strip material, of lighter gauge than previously considered possible, may be used for the skins, and because the customary pre-stretching operation is eliminated in most cases, use may be made of higher grade materials.

(e) Due to the fact that the segments are completed in the flat state and subsequently bent in the lengthwise direction on assembly to produce a streamlined form, due to the depth of the stiffeners used, and the curvature of the skin, the neutral axis falls inside the outer parts of the skins, which must therefore become tensioned. This initial stress removes or tends to remove any irregularities or quilting and produces a smooth external surface, thus adding to its aerodynamic efficiency and panel stiffness under load. It is well known that thin skin structures always fail under load due to buckling of the skins in compression and shear. When built-in tension is used and an external load applied the tension load is increased on the tension side, which is harmless. However, on the side taking compression due to external load, the whole of the built-in tension must first be completely negatived before the panels begin to take compression. Thus a considerable load may be applied to the completed structure before any part of the skins begins to be in compression. The same remarks apply, of course, to panels in shear.

(f) In the event of damage to any part necessitating replacement of panels, new segments may be fitted as required, and comparatively large areas may be repaired if necessary.

(g) Tension induced in the strips or the like forming the skin-like shell gives increased stability to components of the shell which are in compression. If it is required to have any part of the shell free from tension then each segment constituting that part would have edges parallel to each other over the untensioned portion or a separately made portion can be employed which is subsequently assembled to tensioned parts of the shell. This untensioned portion may have window and door openings and carry wing attachment brackets.

(h) The ability is afforded to vary the tension for a given curvature by the addition of external or internal detachable stiffeners which are removed after final assembly.

(j) Segments or parts of a shell may be made as separate units on suitable jigs, complete with edge members, and may be stored in the single-curvature condition in readiness for urgent repair or assembly.

(k) There is an improved appearance and aerodynamic efficiency due to smoothness of the skin-like shell when bent longitudinally.

In order that the invention may be more readily understood a number of applications thereof will now be described with reference to the accompanying drawings, wherein:

Figure 1 is a plan view of one of a number of edge-contoured flat symmetrical metal strips for use in fabricating the streamlined fuselage shown in Figures 9 and 10.

Figure 2 is a side elevation of the strip with edge stiffeners in position.

Figure 3 is a cross section on line III—III of Figure 2.

Figure 4 is a detail view of one end of an edge-stiffened strip after being curved transversely.

Figures 5 and 5A are diagrammatic representations of a single combined press and heating jig for cementing both edge stiffeners to the strip shown in Figures 1, 2 and 3.

Figure 6 is a side view of the edge-stiffened strip after being stressed to a double curvature form.

Figure 7 is a cross section on line VII—VII of Figure 6.

Figure 8 is a pictorial view of a portion of a double-curvature strip showing the use of intermediate longitudinal stiffeners and of transverse stiffeners.

Figure 9 is a side elevation of a streamline fuselage formed by the interattachment following deformation longitudinally and transversely on a jig of a number of identical flat plates of the shape shown in Figure 1.

Figure 10 is an end view looking in the direction of arrow X, Figure 9.

Figure 11 is a cross section on line XI—XI of Figure 9.

Figure 12 is another view showing the inter-attachment of edge-stiffened and longitudinally and transversely reinforced strips, with provision for securing a fabric fuselage lining in position.

Figures 13, 14 and 15 are diagrams showing how the position of the neutral axis of the jig-deformed strips can be adjusted.

Figures 16, 17 and 18 illustrate diagrammatically and respectively a fuselage constructed in the form of two transversely divided halves; and engine unit, and the interpositioning of the engine unit between the two halves of the transversely divided fuselage.

Figure 19 illustrates by a so-called "exploded" view the sections of the built-up fuselage of Figure 18.

Figure 20 illustrates diagrammatically how the same method of construction can be applied to a double-walled nacelle for a jet engine, wherein smooth exterior and interior surfaces are required.

Figure 21 illustrates how a fuselage may be constructed in the form of two longitudinally divided halves.

Figure 22 is a pictorial view of a manufacturing jig suitable for fabricating one of the fuselage halves of the form shown in Figure 21.

Figure 23 is a pictorial view of an assembly jig suitable for assembling the two halves of the longitudinal split fuselage in Figure 21.

Figure 24 is a pictorial view of a manufacturing jig suitable for fabricating the bottom part of a reverse-curve aircraft hull or float.

Figure 25 shows diagrammatically in cross section an aircraft hull or float with a bottom part of reverse curve form.

Figure 26 shows diagrammatically in cross section a boat hull with a cambered deck of reverse curve form.

Figure 27 is a diagrammatic representation of a jig for use in making a transversely split structure of the form shown in Figures 16 to 19.

Figures 28 and 29 illustrate two further fuselage cross sections of "closed" form.

Figures 30 and 31 are diagrammatic representations of a fuselage of so-called double-bubble form, Figure 31 being a cross section on line XXXI—XXXI of Figure 30.

Figure 32 is a diagrammatic cross section of a jig used in making a double-bubble fuselage.

Figure 33 is a pictorial view of a hanger made according to the method of this invention.

Figure 1 of the drawings shows in plan one of a number of identical strips 1 used to form the skin of the shell-like body of the streamlined fuselage shown in Figures 9 and 10, the skin in this particular embodiment being constituted wholly by strips of the one shape shown. The ability to fabricate a hollow body from a number of identical strips of one particular shape, which can all be cut together to a common template saves time, labour and material and greatly facilitates production. Each strip 1 is symmetrical about a longitudinal axis A—A and to the longitudinal edges 2 of bulging contour are attached permanent edge stiffeners 3 of any suitable form in cross section.

In Figure 3 the permanent edge stiffeners are shown as of channel shape and each stiffener abutment face must be at right angles to the skin when flat to ensure correct abutment throughout its length to the corresponding channel of the next segment when the segment has been finally deformed on the assembly jig, as indicated in Figure 7.

In addition to its permanent edge stiffeners 3 the strip 1 has attached to it on the same face as that carrying said stiffeners 3, a number of frame segments 4 and these also are set at various angles so as to ensure that when the strip 1 is curved longitudinally to fit the jig on which the shell is being made all of the circumferentially aligned frame segments 4 lie in the same plane, namely, perpendicular to the longitudinal axis B—B of the fuselage, as indicated in Figure 9. Each frame segment 4 is thus set at a varying angle $b$ to the normal of the surface of the strip 1 (Figure 4), said angle $b$ being substantially equal to the angle $b^1$ between the transverse plane of a frame member constituted by aligned frame segments 4 and the tangent to the longitudinal curvature of the fuselage in the region of said frame member. To facilitate attachment to the flat strip 1 of the frame segments 4 in correct positions, sets of register holes 5 are made in the strip 1 whilst flat. The register holes 5 in each set, one set for each frame segment, are arranged in a pitch radius $r$ which is smallest for the sets of holes adjacent the ends 6 of the strip and which increases for sets of holes provided inboard along the length of the strip, the centre of radius for the set of holes at the midway plane C—C of the strip length being at infinity. The ends 6 of the strip are concavely curved so that the edges lie in planes perpendicular to the fuselage axis B—B when the strip is deformed into a double curvature.

Figure 6 shows the edge-stiffened strip 1 in its double-curvature form, the lines $b^2$ indicating the parallel planes assumed by the frame segments 4 when the strip 1 has been deformed by double-curvature on a jig. The positions of more robust frame members 7 (Figure 9), which are used especially in the region of wing attachment, are indicated by lines $c$ in Figure 6.

Intermediately of the edge stiffeners 3, longitudinal stringers 8 may be attached to each strip, Figure 8, and in regions such as $d$, Figure 9, where the number of stringers is decreased because of narrowing of the strip, the stringers may overlap lengthwise for a distance. The longitudinal stringers 8, which pass through gaps 9 in the frame segments 4, may be of socalled "top-hat" shape in cross section. The edge stiffeners 3, frame segments 4, and the stringers 8 are attached to the strip 1 by any suitable method, such as riveting, spot-welding, strip-welding or cementing. A convenient method is first to cement, rivet or weld the edge stiffeners in position to the flat skins and then bolt, rivet or weld the frame segments to the strip, which introduces the required transverse curvature to the skins. Figures 5 and 5A illustrate diagrammatically how the recessed top and bottom formers 10, 11 respectively of a single combined press and jig may be used to apply pressure and heat for cementing purposes to the flat sheet and edge stiffeners $3a$ on opposite longitudinal edges of a strip 1 by turning the strip over between the two operations. Incidentally, these figures illustrate the use of edge stiffeners of "top-hat" section instead of the channel sectioned stiffeners 3 previously described. It will be appreciated that such heat presses need have single plane curvature only as the process is applied with the strips in the flat condition.

The circumferentially aligned frame segments 4 which constitute the transverse frame members of the fuselage body may be interattached by their adjacent ends in any suitable manner. Figure 11 illustrates the manner of interattaching the permanent edge stiffeners 3 to form the equivalents of the one-piece longerons usually employed in fuselage construction, and the attachment to the frame segments 4a of a bulkhead 12, and incidentally shows skin strips 1 with stringers 8a of a form different from those shown in Figure 8. Figure 12 illustrates by way of example, other forms of frame segments 4b, stringers 8b and permanent edge stiffeners 3b, 3b¹ and a mode of stretching a fabric lining 13 by means of clamping bars 14 secured to paired stiffeners, which may also provide continuity of the frames 4b.

The method adopted in practice in the fabrication of a hollow body, such as the type of fuselage already described, consists in attaching the edge stiffeners and frame segments, and if required the stringers to the strip and then applying the strip assembly to a suitable jig, whereon the strip assembly, which possesses transverse curvature by reason of the attachment of the frame segments, is held by temporarily securing some frame segments to the jig. Loading is then applied to the strip assembly to draw the strip assemblies into conformity with the jig, thereby producing the requisite longitudinal curvature and then interattaching adjacent edge stiffeners of the deformed strip assemblies to form a complete unitary shell having double-curvature.

It will be readily appreciated that having made a strip assembly with transverse curvature, the act of producing double-curvature therein by deforming the strip assembly longitudinally induces tension in the outer or centre areas of the skin and compression in the edge stiffeners. For reasons which need not be detailed here it is considered desirable to be able to exercise some control over the degree of these tensile and compressive loads for a given longitudinal curvature.

For instance if it is required to produce a high tension field in the skin but to keep the compressive loads in the side members low, this can be done by moving the neutral axis of the section as far away from the skin line as is necessary. This will be more readily understood by referring to Figure 13, which shows diagrammatically the relative position of the neutral axis $xy$ in a normal arrangement, and the lowering of the neutral axis to $x^1y^1$ by attaching temporarily to the permanent edge stiffeners 15 of the strip 1 auxiliary edge stiffeners 16. Alternatively, as indicated in Figure 14, it may be desired to produce a low tension field in the skin with high compression in the edge stiffeners 15, and this can be effected by attaching temporarily to the strip above said stiffeners 15 auxiliary edge stiffeners 17, thus raising the neutral axis to $x^2y^2$. Normally it would appear that in structures subjected to bending loads the ideal condition is to provide for high tension in the skin with initially unstressed compression members. Such a condition may be obtained by lowering the neutral axis still further to $x^3y^3$ as shown in Figure 15, by employing auxiliary stiffeners 18 and adding unstressed longerons 19 to the complete shell. The auxiliary stiffeners may provide the greater part of the stability required at the edges of the strip, whilst bending longitudinally. It is considered desirable to avoid the use of a longitudinal stringer at the zone of main tension in the skin, that is, under the crown of the camber, as a stringer in this position has been found to become tensioned; on the contrary it is preferable for the skin to collect all the tension imposed on the strip assembly. Accordingly the stringers should if possible be disposed symmetrical to the longitudinal centre of the strip as shown in Figures 8 and 11, rather than centrally as shown in Figure 12, although as indicated in Figure 9 centrally disposed stringers may be necessary in the narrower portions of the strips. It is possible, however, that in many cases stringers can be dispensed with entirely, but this is clearly dependent on the mean width of the strip, the loading imposed and other factors.

It has been established by tests that a shell having tension in its skin as the result of double curvature deformation can carry a much higher load than a shell made of preformed panels. It is believed that compressive and shear loading is the main cause of buckling and this is avoided by using a skin initially stressed by tension. Accordingly the deliberate introduction into a shell of controlled tension which has to be entirely removed by load before compression starts must result in a reduction of structural weight for a given loading.

Instead of making a fuselage which, with the exception of a separate nose cap and a separate tail piece, is in the form of a unitary body, the fuselage may be split transversely and comprised of two or more sections which are made separately on jigs and then joined together. If the fuselage is symmetrical in relation to a mid-length transverse plane, as shown in Figure 16, two identical halves 20, 20A (Figure 18) may be made on the same jig and the halves subsequently joined. This mode of fabricating hollow bodies in transversely split sections facilitates the production of fuselages of a variety of forms. For instance a jet motor installation having a parallel shroud 21 (Figure 17) of the same girth and cross sectional shape as the larger ends of the fuselage halves 20, 20A of Figure 16 may be interposed between the two halves as shown in Figure 18 with the nozzle 22 of the jet motor installation extending into the rear half 20A. The front half 20 may be fitted with a nose cap 23 and domed end diaphragms 24, 24A, shown more clearly in Figure 19, to form a pressurised cabin. The front half 20 of the shell can be provided with a cockpit opening 25 above which a hood 26 can then be fitted. Figure 19 shows an alternative form of mid-section 27 having slots 27A for wing attachment purposes. Cockpit openings, doorways, wing attachment slots and the like can be cut-away after the shell has been made by deformation of strips on a jig, without interfering with the distribution of loads in the stressed skin.

The constructions of hollow bodies as already described, whether as complete units or in transversely or longitudinally split halves or sections, have referred to the permanently attached stiffeners, stringers and frame segments as disposed within the skin-forming strips, but this is not essentially so, and if desired these structural elements may be arranged on the outside of the strips, as depicted in Figure 20 which shows how a double-walled structure, in the form of a jet motor nacelle, may be made.

The method of constructing hollow bodies according to this invention may be applied to structures constituted by two longitudinally divided portions 28, 28A which are subsequently joined. The construction of a streamlined fuselage in longitudinally divided halves is known per se and the advantages thereof are recognised, particularly the facility to install equipment in the fuselage halves before joining them together. However, it has been considered necessary previously to employ rather substantial half bulkheads in the fuselage halves composed of preformed panels, whereas greater accessibility is afforded by the method of construction according to this invention, since it is simply necessary to provide the fuselage half (Figure 21) when stripped from the manufacturing jig with slender transverse spacers 29 to counteract the tendency for the wall of the shell to close in at cross zones intermediately of its length. Strong half frames 30 are also inserted in the ends of the half fuselage to counteract the tendency for the shell to spread open at the ends. The spacers 29 and end frames 30 may be removed after the two fuselage halves have been joined together.

Jigs for use in making hollow bodies according to this invention will be varied to suit particular requirements and those to be described herein are simply representative of many forms which could be employed. The jig shown in Figure 22, which is suitable for use in manufacturing a longitudinal fuselage half 28 or 28A of the form shown in Figure 21, comprises an open horizontal frame 31 having spaced transverse bars 32 supporting a number of semi-circular plates 33 located by a longitudinal bar 34. The spaces between the bars 32 afford free access for riveting operations. This jig may be modified to dispose the frame 31 and bars 32 vertically instead of horizontally as shown. Figure 23 shows a jig consisting of segmental discs 35 mounted on a shaft 36. This jig is suitable for manufacturing a unitary fuselage of the kind shown in Figure 9 or for assembling together two fuselage halves 28, 28A after manufacture on the jig shown in Figure 22. The segmental discs 35 are dismantled after the assembled fuselage has been lightly secured by pop rivets or other fasteners, to afford free access to the fuselage interior for final riveting, welding or bolting.

The hollow bodies particularly described herein have been those having circular cross sections composed entirely of outwardly bulging or convex surfaces, but as already mentioned the invention is not limited to making bodies of such forms. Figure 24 shows, for example, a jig suitable for making an "open" section hollow body which has reverse or concave double-curvature surfaces made by deforming transversely curved edge-stiffened strips to conform to the symmetrically concaved plates 37. A body of this kind may form the keel portion 38 of a hull or float having a circular arc top portion 39, as shown diagrammatically in Figure 25. Conversely such a reverse curve body may form the deck 38A of a streamlined boat hull 39A, of circular arc cross section as shown diagrammatically in Figure 26. Figure 27 illustrates diagrammatically a jig constructed in halves, each of substantially the same construction as shown in Figure 23; this jig is suitable for making, assembling and removing transversely split bodies, without breaking down the jig, such as that shown in Figure 18. It will be evident from the foregoing that the skins of shell-like bodies made according to this invention are not necessarily of circular form in cross section, but may be of circular arc cross section, as in the case of the float keel of Figure 25 and the boat deck of Figure 26. Moreover, the strip or panels which constitute these bodies of circular arc cross section need not all be of the same form. Figures 28 and 29 illustrate respectively and by way of example fuselages of substantially triangular or peg-top cross section and of substantially square cross section. Each of these constructions make use of side panels 40 of appreciable mean width alternating with corner strips 41 of narrower width. The panels 40 are conveniently made in the manner already described, that is, by producing transverse curvature by the attachment of frame segments and longitudinal curvature by enforced deformation into conformity with a jig. The corner strips 41 may be made in a similar manner but it may be preferable to perform these corner strips by previously known methods.

Figures 30 and 31 illustrate still further the versatility of the method, namely in its application to the construction of a fuselage of so-called "double-bubble" cross section. A structure of this form may be made by constructing separately the upper and lower longitudinally and horizontally divided halves 42, each half being of circular arc cross section and made with double-curvature according to the method already described. Amidships, or at the transverse plane of maximum girth the centre of curvature of radius R may be situated, as shown, at an appreciable distance from the horizontal dividing plane P, gradually approaching that plane toward the end of the half fuselage, as indicated by the centre lines L. A jig for making the half fuselage 42 is shown diagrammatically in Figure 32 and comprises longitudinally spaced square jig plates 43 somewhat similar to the jig shown in Figure 22. The frame segments 44 of the half fuselage 42 are located by attachment brackets 45 at the corners of the jig plate 43. Cross ties 46 can first be fixed to prevent spreading of the body when the jig plates are removed. From the preceding description of structures which can be made by the method of construction according to this invention it will be readily apparent to those skilled in the art of manufacturing hollow bodies in sheet material that there are many other structures to which the method can be applied. The aircraft industry affords many other examples of such structures, for example, wings and other aerofoils, wind tunnels, engine nacelles, fuel tanks and hangers. A typical example is the covering for a hanger construction shown in Figure 33 which comprises a series of hoop units 47 each with double curvature of circular arc form, the units being joined together to form the complete structure.

I claim:

1. A hollow body, such as the streamline fuselage or hull of an aircraft, in the form of a shell which is curved longitudinally and transversely, said shell comprising a number of main panels of symmetrical generally tapering contour, stiffener elements secured to the longitudinal edges of said panels, corner strips preformed to transverse curvature and provided with stiffened edges, said edge-stiffened main panels and corner strips being interconnected to form a unitary shell and said main panels having imparted thereto a stressed skin obtained by deformation of said panels from substantially flat form in the act of assembling said strips to a jig, and transverse curved frame elements interconnected one to the other and to the interconnected alternate main panels and corner strips.

2. A method of constructing a hollow body, such as the streamlined fuselage or hull of an aircraft, in the form of a shell which is curved longitudinally and transversely, said method comprising the steps of providing a number of substantially flat strips of generally tapering contour, as viewed in plan, and provided with edge stiffening adapted to dispose the transverse neutral axis of each edge-stiffened strip out of the plane of the flat strip, applying the edge-stiffened strips to an assembly jig, deforming the strips by localised pressure in order to locate the strips to the jig both longitudinally and transversely, thereby imposing skin stress on the deformed strips, and bringing stiffened edges of adjacent strips into proximity, and then securing adjacent strips to form a unitary skin-stressed shell.

3. A method of constructing a hollow body, such as the streamlined fuselage or hull of an aircraft, in the form of a shell which is curved longitudinally and transversely, said method comprising the steps of providing a number of substantially flat metal strips of symmetrical, generally tapering contour as viewed in plan, providing separate metal edge-stiffener elements, securing said edge-stiffener elements to longitudinal edges of said substantially flat strips so as to disposed the transverse neutral axis of each edge-stiffened strip out of the plane of the flat strip, providing curved transverse frame members, applying said edge-stiffened strips and said transverse frame members to an assembly jig, deforming the strips by localised pressure in order to locate the strips to the jig both longitudinally and transversely, thereby imposing skin stress on the deformed strips, and bringing stiffened edges of adjacent strips into proximity, and then securing adjacent edge-stiffened strips together and to said transverse frame members to form a unitary skin-stressed structure.

4. A method of constructing a hollow body according to claim 3, wherein for the purpose of producing a high tension field in the shell with low compressive loads in the edge stiffeners, the neutral axis of the strip is displaced away from the normal neutral axis of the stiffened skin of the shell by attaching stiffener members which are removed after adjacent strip edges have been interattached.

5. A method of constructing a hollow body according to claim 4, characterised in that the auxiliary stiffener members are arranged so as to provide the greater part of the stability required at the edges of the strip, whilst bending longitudinally.

6. A method of constructing a hollow body having a tensioned skin and constituted by a plurality of skin-stressed units connected together, comprising the steps of producing each of said plurality of units by providing a sheet material elongated strip with stiffening elements along generally opposite edges of said strip to displace the neutral axis of each edge-stiffened strip away from said strip in its initial form, deforming said edge-stiffened strip into a form other than its initial form, at least one of said forms being curved, and attaching together adjacent stiffening elements of an assembly of said plurality of edge-stiffened strips to form a unitary skin-stressed shell.

7. A method as claimed in claim 6 comprising the further step, during the deforming of each of said strips, of securing said strips to frame sections which on the plurality of edge-stiffened strips being assembled are themselves interconnected to form complete stiffener frames disposed substantially at right angles to said edge-stiffener elements.

References Cited in the file of this patent

UNITED STATES PATENTS

| | | |
|---|---|---|
| 362,107 | Pemfield | May 3, 1887 |
| 1,361,835 | Delage | Dec. 14, 1920 |
| 1,541,976 | Longren | June 16, 1925 |
| 1,866,534 | Janin | July 12, 1932 |
| 1,885,406 | Bechereau | Nov. 1, 1932 |
| 1,939,558 | Loudy | Dec. 12, 1933 |
| 1,942,149 | Ragsdale | Jan. 2, 1934 |
| 2,212,456 | Rethel | Aug. 20, 1940 |
| 2,279,091 | Odenbach | Apr. 7, 1942 |
| 2,387,219 | Wallis | Oct. 16, 1945 |
| 2,504,422 | Johnson et al. | Apr. 18, 1950 |

FOREIGN PATENTS

| | | |
|---|---|---|
| 567,557 | Great Britain | Feb. 20, 1945 |